US008472680B2

United States Patent
Choi et al.

(10) Patent No.: US 8,472,680 B2
(45) Date of Patent: Jun. 25, 2013

(54) APPARATUS AND METHOD FOR BIOMETRIC REGISTRATION AND AUTHENTICATION

(75) Inventors: Woo Yong Choi, Daejeon (KR); Dae Sung Moon, Daejeon (KR); Yongjin Lee, Daejeon (KR); Ki Young Moon, Daejeon (KR); Jang-Hee Yoo, Daejeon (KR); Yun Su Chung, Daejeon (KR); So-Hee Park, Daejeon (KR); Byung Jun Kang, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 771 days.

(21) Appl. No.: 12/614,564

(22) Filed: Nov. 9, 2009

(65) Prior Publication Data

US 2011/0037563 A1    Feb. 17, 2011

(30) Foreign Application Priority Data

Aug. 17, 2009    (KR) ........................ 10-2009-0075765

(51) Int. Cl.
*G06K 9/00* (2006.01)
(52) U.S. Cl.
USPC ........................................... 382/116
(58) Field of Classification Search
None
See application file for complete search history.

(56) References Cited

U.S. PATENT DOCUMENTS

| 7,035,442 B2* | 4/2006 | Ha et al. ........................ 382/124 |
| 2008/0013804 A1 | 1/2008 | Moon et al. |
| 2008/0065900 A1 | 3/2008 | Lee et al. |
| 2009/0113209 A1* | 4/2009 | Lee et al. ..................... 713/186 |

FOREIGN PATENT DOCUMENTS

| KR | 100714303 B1 | | 4/2007 |
| KR | 1020080022729 A | | 3/2008 |
| KR | 1020080070363 A | | 7/2008 |
| WO | WO 02/37403 | * | 5/2002 |
| WO | WO 2008/069475 | * | 6/2008 |

OTHER PUBLICATIONS

English Translation for Korean Patent Publication 1020080070363, Yonghwa Jeong et al., publication date Jul. 30, 2008.*
Umut Uludag, et al; "Fuzzy Vault for Fingerprints", Audio and Video based biometric person authentication No. 5 Hilton Rye Town, NY, ETATS-UNIS, Jul. 20, 2005, vol. 3546, pp. 310-319.
Alisher Kholmatov, et al; "Realization of Correlation Attack Against the Fuzzy Vault Scheme", SPIE-IS&T, vol. 6819, Mar. 18, 2008, pp. 681900-1-681900-7.

* cited by examiner

*Primary Examiner* — Samir Ahmed
(74) *Attorney, Agent, or Firm* — Ladas & Parry LLP

(57) ABSTRACT

A biometric register includes: a feature extraction unit for performing preprocessing for a fingerprint to extract a feature point m for the fingerprint; a transformation function generation unit for generating a transformation function which is composed of an arbitrary rotation matrix and an arbitrary vector; and a template generation unit for transforming a coordinate of the feature point m using the generated transformation function, and organizing a fuzzy vault using a randomly generated fake feature point and a feature point $m_1$ applied by the transformed coordinate, thereby generating a one-time template.

8 Claims, 3 Drawing Sheets

APPARATUS AND METHOD FOR BIOMETRIC REGISTRATION AND AUTHENTICATION

CROSS-REFERENCE(S) TO RELATED APPLICATION(S)

The present invention claims priority of Korean Patent Application No. 10-2009-0075765, filed on Aug. 17, 2009, which is incorporated herein by reference.

FIELD OF THE INVENTION

The present invention relates to a biometric registration and authentication, and, more particularly, to an apparatus and method for biometric registration and authentication capable of improving a security of fingerprint recognition system.

BACKGROUND OF THE INVENTION

Recently, information exchange is becoming more active and industries related to e-commerce such as online banking are expanding pursuant to development of the Internet. Accordingly, authentication of users is required to be more precisely performed. In general, a PIN (personal identification number) or a password has been used to authenticate a user. However, there is a possibility that the PIN or password can be exposed or forgotten, and thus, a security problem is increasingly becoming important issue. In order to solve this problem, biometric recognition technology has been introduced.

However, since biometric information may be impossible to change or limited to change, it causes significant problem when the biometric information stored for authentication of a user is illegally used by other person. Therefore, studies for protecting the biometric information such as a fingerprint of a user are actively being conducted using a technique such as a code, watermarking and steganography.

A fingerprint recognition system costs effectively on installation and has a high reliability for security. Especially, the fingerprint recognition system can be configured in a compact size, so that it can be movable and arranged at any space.

As people's interest in protecting their own privacy increases, the fingerprint recognition technology is developing as the most outstanding technology in an image recognition technology field. Such a fingerprint recognition technology is used not only for a simple access control system but also for a remote application system such as Internet banking, electronic government, etc.

A fuzzy vault system has been proposed to safely protect a fingerprint feature point, but attack methods thereto such as correlation attack has also been discovered, so that the fuzzy vault system has been exposed to a danger in security. Also, when the fingerprint feature point transmitted through a network is exposed, the fingerprint recognition system is also exposed to an attacker.

Therefore, the fingerprint recognition system using the fuzzy vault has a problem of weak security.

SUMMARY OF THE INVENTION

In view of the above, the present invention provides an apparatus and method for biometric registration and authentication capable of protecting an original template of a registered fingerprint by configuring a one-time template for the registered fingerprint not to find out the original template although the one-time template is exposed.

In accordance with a first aspect of the present invention, there is provided a biometric register, including:

a feature extraction unit for performing preprocessing for a fingerprint to extract a feature point m for the fingerprint;

a transformation function generation unit for generating a transformation function which is composed of an arbitrary rotation matrix and an arbitrary vector; and a template generation unit for transforming a coordinate of the feature point m using the generated transformation function, and organizing a fuzzy vault using a randomly generated fake feature point and a feature point $m_1$ applied by the transformed coordinate, thereby generating a one-time template.

In accordance with a second aspect of the present invention, there is provided a biometric authenticator communicating with a register which manages a one-time template and a transformation function, including:

a fingerprint input unit for receiving a fingerprint for authentication;

a feature extraction unit for performing preprocessing for the fingerprint for authentication to extract a feature point m' of the fingerprint;

a fingerprint transformation unit for transforming a coordinate of the feature point m' using the transformation function provided from the register; and a authentication unit for authenticating the fingerprint by matching the one-time template provided from the register and a feature point $m'_1$ applied by the transformed coordinate.

In accordance with a third aspect of the present invention, there is provided a biometric registration method, including:

receiving a fingerprint image for registration;

performing preprocessing for the fingerprint image to extract a feature point m of the fingerprint image;

transforming a coordinate of the feature point m using a transformation function composed of an arbitrary rotation matrix and an arbitrary vector; and organizing a fuzzy vault using a randomly generated fake feature point and a feature point $m_1$ applied by the transformed coordinate to generate a one-time template for the fingerprint image.

In accordance with a fourth aspect of the present invention, there is provided a biometric authentication method communicating with a register which manages a one-time template and a transformation function, including:

receiving a fingerprint image for authentication;

performing preprocessing for the fingerprint image to extract a feature point m' of the fingerprint image;

transforming a coordinate of the extracted feature point m' using the transformation function provided from the register; and authenticating the fingerprint by matching the one-time template provided from the register and a feature point $m'_1$ applied by the transformed coordinate.

BRIEF DESCRIPTION OF THE DRAWINGS

The above features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings.

Figure 1:
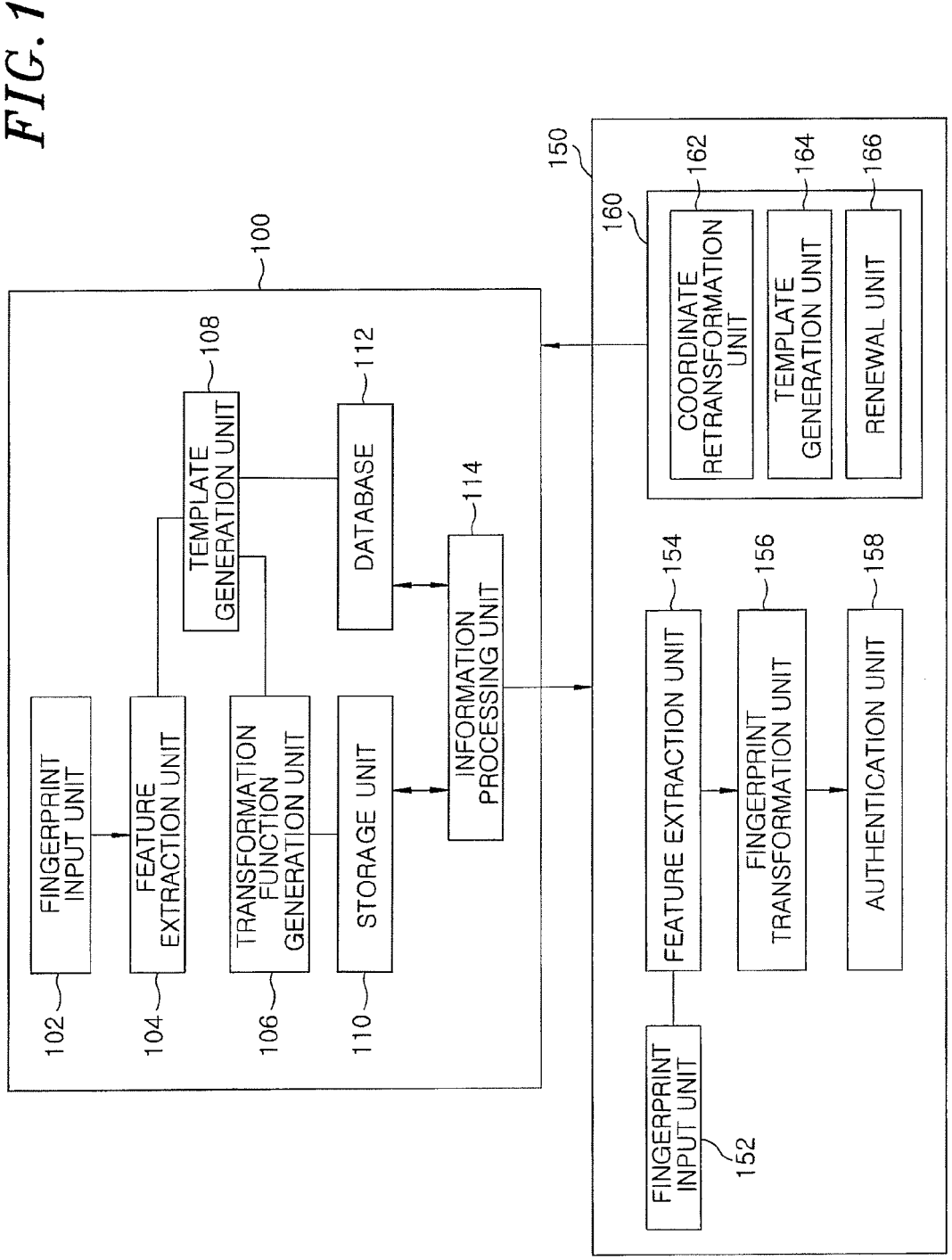
FIG. 1 shows a block diagram illustrating a fuzzy vault system using a one-time template in accordance with an embodiment of the present invention

FIG. 1 shows a block diagram illustrating a fuzzy fingerprint vault using a one-time template in accordance with an embodiment of the present invention. The fuzzy fingerprint vault includes a fingerprint register 100 and a fingerprint authenticator 150.

The fingerprint register 100 includes a fingerprint input unit 102, a feature extraction unit 104, a transformation function generation unit 106, a template generation unit 108, a storage unit 110, a database 112, and information processing unit 114.

The fingerprint input unit 102 receives a fingerprint image from a user to provide the fingerprint image to the feature extraction unit 104.

The feature extraction unit 104 performs preprocessing for the fingerprint image to extract a feature point m from a fingerprint image. The feature point m is composed of a coordinate w, an angle θ and a type t, and the coordinate w is represented as x, y coordinate pair.

The transformation function generation unit 106 generates a transformation function composed of an arbitrary rotation matrix $A_1$ and an arbitrary vector $b_1$, as shown in Equation 1.

$$A_1 = \begin{pmatrix} \cos\alpha_1 & -\sin\alpha_1 \\ \sin\alpha_1 & \cos\alpha_1 \end{pmatrix}, \quad b_1 = \begin{pmatrix} b_{11} \\ b_{12} \end{pmatrix} \quad \text{Equation 1}$$

The generated transformation function is stored in the storage unit 110 and at the same time is provided to the template generation unit 108 for generation of a one-time template.

The template generation unit 108 transforms the coordinate w of the feature point m into a coordinate $w_1$ using the provided transformation function. In this regard, the angle θ and the type t of the feature point m are not transformed. Also, the template generation unit 108 generates a feature point $m_1$ to which the transformed coordinate $w_1$ is applied, as shown in Equation 2.

$$w_1=(x_1,y_1)=A_1 w+b_1$$

$$m_1=(x_1,y_1,\theta,t) \quad \text{Equation 2}$$

Thereafter, the template generation unit 108 randomly generates a fake feature point to insert the fake feature point into the feature point $m_1$, and, organizes a fuzzy vault by creating an arbitrary polynomial expression using the feature point $m_1$ to which the fake feature point is applied, to thereby generate the one-time template. Specifically, the template generation unit 108 creates the arbitrary polynomial expression of which coefficient is an element of a finite body, and projects the feature point $m_1$ onto a point on the polynomial expression and the fake feature point onto a point outside of the polynomial expression, thereby organizing the fuzzy vault.

The one-time template is then stored in the database 112.

The information processing unit 114 has a variety of network interfaces such as wire/wireless communication network, infrared communication and Bluetooth. Through the network interfaces, the information processing unit 114 is connected to the fingerprint authenticator 150. The information processing unit 114 updates the transformation function stored in the storage unit 110 or updates the one-time template stored in the database 112 using information which is received via the network interfaces.

Also, the information processing unit 114 provides information of the one-time template, the transformation function and the transformed coordinate $w_1$ which are required for authentication of fingerprint by request of the fingerprint authenticator 150.

The storage unit 110 may be implemented with a memory, IC (integrated circuit) card, or hard disk in the fingerprint register 100.

The fingerprint authenticator 150 includes a fingerprint input unit 152, a feature extraction unit 154, a fingerprint transformation unit 156, an authentication unit 158 and an information provision unit 160. The information provision unit 160 includes a coordinate retransformation unit 162, a template generation unit 164, and a renewal unit 166.

The fingerprint input unit 152 receives a fingerprint image from any user to provide the fingerprint image to the feature extraction unit 154.

The feature extraction unit 154 performs preprocessing for the fingerprint image to extract a feature point m' from the fingerprint image. The feature point m' is composed of a coordinate w', an angle θ' and a type t', and the coordinate w' is represented as x', y' coordinate pair.

The fingerprint transformation unit 156 generates a transformed coordinate $w'_1$ by transforming the coordinate w' of the feature point m' using the transformation function stored in the storage unit 110 of the fingerprint register 100. The fingerprint transformation unit 156 also generates a feature point $m'_1$ to which the transformed coordinate $w'_1$ is applied, as shown in Equation 3. The feature point $m'_1$ is provided to the authentication unit 158.

$$w'_1=(x'_1,y'_1)=A_1 w'+b_1$$

$$m'_1=(x'_1,y'_1,\theta',t') \quad \text{Equation 3}$$

The authentication unit 158 performs an authentication by matching the feature point $m'_1$ with the one-time template stored in the database 112 of the fingerprint register 100. When the authentication succeeds, the information provision unit 160 generates updated information to provide the updated information to the fingerprint register 100. Then, the fingerprint register 100, in response to the received the updated information, updates the transformation function stored in the storage unit 110 and the one-time template stored in the database 112.

The coordinate retransformation unit 162 of the information provision unit 160 generates a transformation function composed of an arbitrary rotation matrix $A_2$ and an arbitrary vector $b_2$, and thereafter retransforms the transformed coordinate $w_1$ of the fingerprint register 100 to generate retransformed coordinate $w_2$, as shown in Equation 4.

$$w_2=A_2 w_1+b_2=A_2 A_1 w+A_2 b_1+b_2 \quad \text{Equation 4}$$

wherein $A_2 A_1$ is a rotation matrix and $A_2 b_1+b_2$ is a vector.

The template generation unit 164 generates a new transformation function which is composed of the rotation matrix $A_2 A_1$ and the vector $A_2 b_1+b_2$. The new transformation function is delivered to the renewal unit 166.

Also, the template generation unit 164 randomly generates a fake feature point, and inserts the fake feature point into a feature point $m_2$ to which the retransformed coordinate $w_2$ is applied. Next, the template generation unit 164 generates a template for updating by organizing a fuzzy vault using the retransformed coordinate $w_2$ and the feature point $m_2$. Specifically, the template generation unit 164 creates an arbitrary polynomial expression of which coefficient is an element of a finite body, and projects the feature point $m_2$ onto a point on the polynomial expression and the fake feature point onto a point outside of the polynomial expression, thereby organizing the fuzzy vault.

The generated template for updating is delivered to the renewal unit 166.

The renewal unit 166 provides the fingerprint register 100 with the new transformation function and the template for updating, so that the fingerprint register 100 updates the transformation function stored in the storage unit 110 and the one-time template stored in the database 112.

Figure 2:
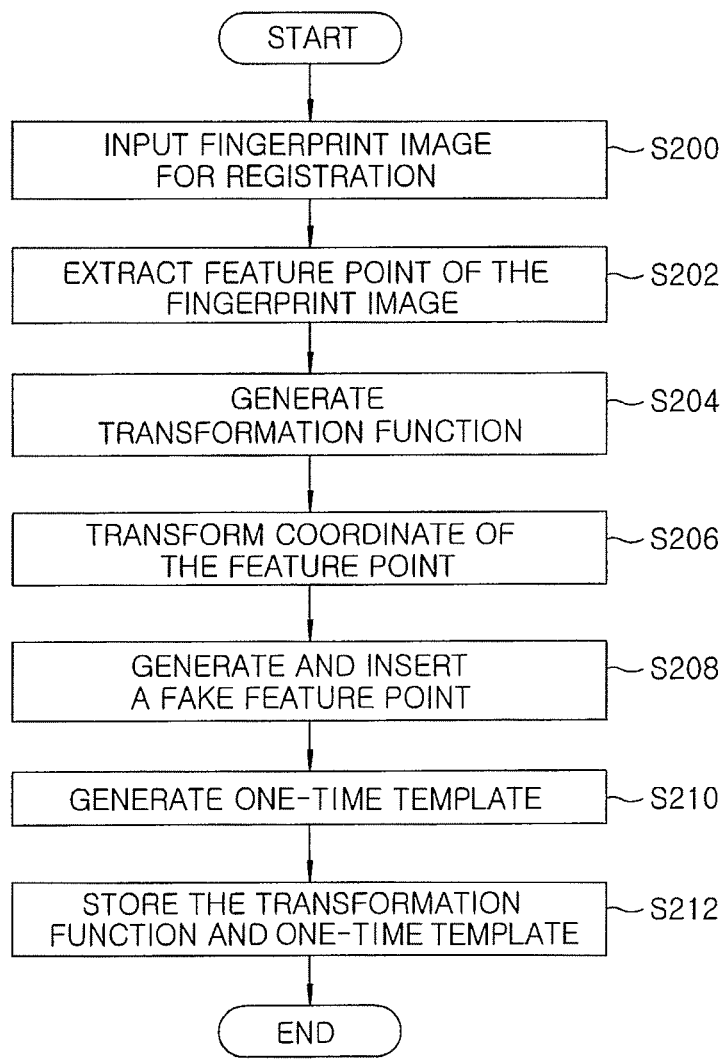
FIG. 2 shows a flowchart illustrating a process of registering a user's fingerprint in accordance with the embodiment of the present invention.

FIG. 2 shows a flowchart illustrating a process of registering a user's fingerprint in the fingerprint register 100 in accordance with the embodiment of the present invention.

Referring to FIG. 2, the fingerprint input unit 102 of the fingerprint register 100 receives a fingerprint image for registration from a user in step S200. The received fingerprint image is then provided to the feature extraction unit 104.

The feature extraction unit 104 performs preprocessing for the fingerprint image to extract a feature point m in step S202. The feature point m is provided to the template generation unit 108. Here, the feature point m may be composed of a coordinate w, an angle θ and a type t.

Next, the transformation function generation unit 106 generates a transformation function composed of an arbitrary rotation matrix $A_1$ and an arbitrary vector $b_1$ in step S204. The transformation function is then provided to the template generation unit 108.

The template generation unit 108 transforms the coordinate w of the feature point m into a coordinate $w_1$ using the transformation function in step S206 and generates a feature point $m_1$ to which the transformed coordinate $w_1$ is applied. Also, the template generation unit 108 randomly generates a fake feature point and inserts it into the feature point $m_1$ in step S208.

Thereafter, the template generation unit 108 generates a one-time template by organizing a fuzzy vault using the fake feature point and feature point $m_1$ in step S210. Specifically, the template generation unit 108 creates an arbitrary polynomial expression of which coefficient is an element of a finite body, and projects the feature point $m_1$ onto a point on the polynomial expression and the fake feature point onto a point outside of the polynomial expression, thereby organizing the fuzzy vault.

The generated one-time template is stored in the database 112 and the transformation function is stored in the storage unit 110 in step S212.

According to the embodiment, only coordinate composing a feature point of fingerprint is transformed using a transformation function, so that the feature point may not be restored without the transformation function.

One-time templates and transformation functions corresponding to fingerprints for a number of users may be generated by repeatedly performing the above processes.

Now, a process of authenticating a user's fingerprint will be described using information on the above registered fingerprint.

Figure 3:
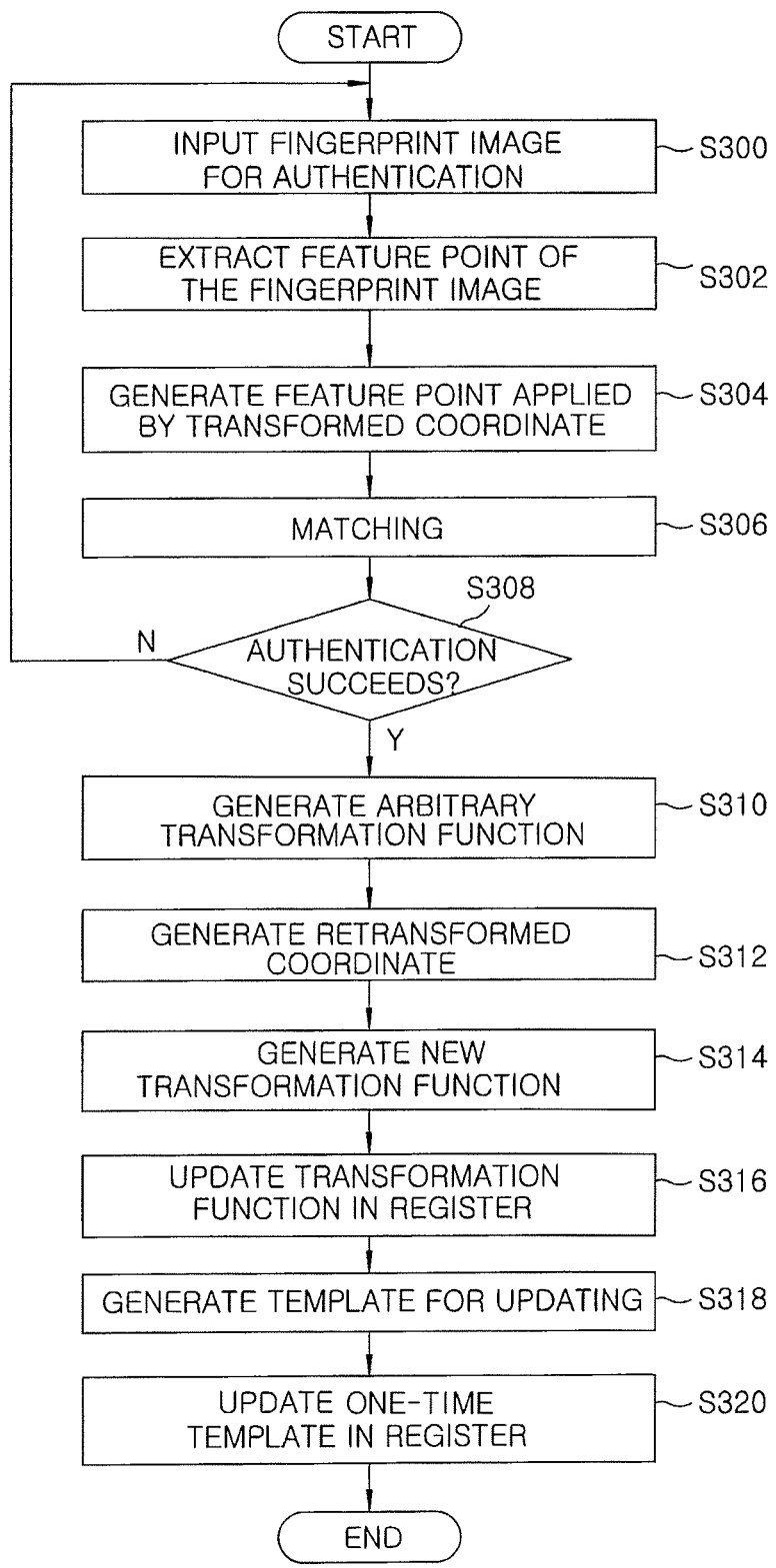
FIG. 3 shows a flowchart illustrating a process of authenticating a user's fingerprint in accordance with the embodiment of the present invention.

FIG. 3 is a flowchart illustrating a process of authenticating a user's fingerprint in the fingerprint authenticator 150 in accordance with the embodiment of the present invention.

Referring to FIG. 3, the fingerprint input unit 152 of the fingerprint authenticator 150 receives a fingerprint image for authentication from any user in step S300. The fingerprint image for authentication is provided to the feature extraction unit 154.

The feature extraction unit 154 performs preprocessing for the fingerprint image to extract a feature point m' in step S302. The extracted feature point m' is provided to the fingerprint transformation unit 156. The extracted feature point m' includes a coordinate w', an angle θ' and a type t', wherein the coordinate w' is represented as x', y' coordinate pair.

The fingerprint transformation unit 156 transforms the coordinate w' of the feature point m' into a coordinate $w'_1$ using the same transformation function as that used in the fingerprint register 100, and then generates a feature point $m'_1$ by applying the transformed coordinate $w'_1$ in step S304. The feature point $m'_1$ to which the transformed coordinate $w'_1$ is applied is delivered to the authentication unit 158.

The authentication unit 158 authenticates the user's fingerprint by matching the feature point $m'_1$ and the one-time template stored in the database 112 in step S306.

If the authentication unit 158 succeeds in authenticating the fingerprint in step S308, the authentication unit 158 makes the information provision unit 160 generate updated information for updating the transformation function and the one-time template within the fingerprint register 100.

Specifically, the coordinate retransformation unit 162 of the information provision unit 160 generates a transformation function consisted of an arbitrary rotation matrix $A_2$ and an arbitrary vector $b_2$ in step S310. Thereafter, using the generated transformation function, the coordinate retransformation unit 162 applies the coordinate $w_1$ of the feature point $m_1$ to the above Equation 4, thereby generating a retransformed coordinate $w_2$ in step S312. The retransformed coordinate $w_2$ is provided to the template generation unit 164.

The template generation unit 164 generates a new transformation function, which is made of a rotation matrix $A_2A_1$ and a vector $A_2b_1+b_2$ in step S314. The new transformation function is delivered to the renewal unit 166. The renewal unit 166 updates the transformation function stored in the storage unit 110 using the new transformation function in step S316.

Next, the template generation unit 164 randomly generates a fake feature point, inserts the fake feature point into the feature point $m_2$ to which the retransformed coordinate $w_2$ is applied, organizes a fuzzy vault using the fake feature point and the feature point $m_2$, thereby generating a template for updating in step S318. Here, the fuzzy vault is organized by creating an arbitrary polynomial expression of which coefficient is an element of a finite body and projecting the feature point $m_2$ onto a point on the polynomial expression and the fake feature point onto a point outside of the polynomial expression.

The renewal unit 166 updates the one-time template stored in the database 112 of the fingerprint register 100 using the generated template for updating in step S320.

As described above, the present invention transforms a coordinate of a fingerprint for authentication using a transformation function stored in the fingerprint register, and authenticates the fingerprint by matching feature point of the fingerprint to which the transformed coordinate is applied and a one-time template registered by the fingerprint register. Further, the present invention updates the transformation function and the one-time template stored in the fingerprint register, thereby safely protecting the template and transformation function even though the template and transformation function are exposed.

While the invention has been shown and described with respect to the embodiments, it will be understood by those skilled in the art that various changes and modification may be made without departing from the scope of the invention as defined in the following claims.

What is claimed is:

1. A biometric register, comprising:
a feature extraction unit for performing preprocessing for a fingerprint to extract a feature point m for the fingerprint;
a transformation function generation unit for generating a transformation function which is composed of an arbitrary rotation matrix and an arbitrary vector; and
a template generation unit for transforming a coordinate of the feature point m using the generated transformation function, and organizing a fuzzy vault using a randomly generated fake feature point and a feature point $m_1$ applied by the transformed coordinate, thereby generating a one-time template, wherein the transformed function is represented by $$A_1 = \begin{pmatrix} \cos\alpha_1 & -\sin\alpha_1 \\ \sin\alpha_1 & \cos\alpha_1 \end{pmatrix}, \quad b_1 = \begin{pmatrix} b_{11} \\ b_{12} \end{pmatrix},$$

wherein $A_1$ is a rotation matrix and $b_1$ is a vector, and wherein the coordinate of the feature point m is transformed by $$w_1 = A_1 w + b_1,$$

wherein $w_1$ is the transformed coordinate of the feature point m, w is the coordinate of the feature point m.

2. The biometric register of claim 1, further comprising:
a database for storing the one-time template; and
a storage unit for storing the transformed function.

3. The biometric register of claim 2, wherein the storage unit is one of IC (integrated circuit) card, a memory, and a hard disk.

4. The biometric register of claim 2, further comprising an information processing unit for providing the transformed function stored in the storage unit and the one-time template stored in the database for use in an authentication via a communication network as requested.

5. The biometric register of claim 4, wherein the information processing unit updates the transformed function and the one-time template using information provided from the authenticator.

6. A biometric registration method, comprising:
receiving a fingerprint image for registration;
performing preprocessing for the fingerprint image to extract a feature point m of the fingerprint image;
transforming a coordinate of the feature point m using a transformation function composed of an arbitrary rotation matrix and an arbitrary vector; and
organizing a fuzzy vault using a randomly generated fake feature point and a feature point $m_1$ applied by the transformed coordinate to generate a one-time template for the fingerprint image, wherein the feature point m is transformed by $$w_1 = A_1 w + b_1,$$

wherein, $A_1$ is a rotation matrix, $b_1$ is a vector, $w_1$ is the transformed coordinate of the feature point m, and w is the coordinate of the feature point m.

7. The biometric registration method of claim 6, further comprising:
storing the transformation function and the one-time template.

8. The biometric registration method of claim 6, wherein the fuzzy vault is organized by generating an arbitrary polynomial expression and projecting the feature point $m_1$ onto a point on the polynomial expression and the fake feature point onto a point outside of the polynomial expression.

* * * * *